(12) United States Patent
Lam

(10) Patent No.: US 6,364,043 B1
(45) Date of Patent: Apr. 2, 2002

(54) CAB LOCKING MECHANISM

(75) Inventor: Chic H. Lam, New Baltimore, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/663,978

(22) Filed: Sep. 19, 2000

(51) Int. Cl.[7] .............................................. B62D 25/10
(52) U.S. Cl. .................................. 180/89.17; 180/89.18
(58) Field of Search ........................... 180/89.17, 89.18, 180/69.2, 69.21, 69.24; 292/126, 226

(56) References Cited

U.S. PATENT DOCUMENTS

| | | | | |
|---|---|---|---|---|
| 3,767,001 A | * | 10/1973 | Chupick | 180/69 C |
| 4,382,482 A | * | 5/1983 | Brandl et al. | 180/69 R |
| 4,482,023 A | * | 11/1984 | Dziedzic et al. | 180/89.17 |
| 5,509,717 A | * | 4/1996 | Martin | 296/77.1 |
| 5,853,060 A | * | 12/1998 | Chao et al. | 180/69.2 |

* cited by examiner

*Primary Examiner*—J. J. Swann
*Assistant Examiner*—L. Lum
(74) *Attorney, Agent, or Firm*—David L. Kuhn; Gail S. Soderling; Clifford Clay Carter

(57) ABSTRACT

A locking mechanism limits the motion of a vehicle cab that swings down on the vehicle chassis to rest on a floating bracket, where the floating bracket is supported by shock absorbers mounted to a chassis. The mechanism prevents upward movement of the floating bracket and thereby prevents upward swing of the cab from the chassis. The locking mechanism includes a flat arm fixed to the floating bracket and a fulcrum member fixed to the flat arm. The fulcrum member pivotally mounts a swing arm having a projection at one end. The mechanism is in a locking condition when the projection engages a mounting bracket fixed to the chassis. At different times when the cab swings down to the floating bracket, the cab's alignment with the chassis varies. The locking mechanism has features which allow it to adjust three-dimensionally to variations in this alignment.

5 Claims, 3 Drawing Sheets

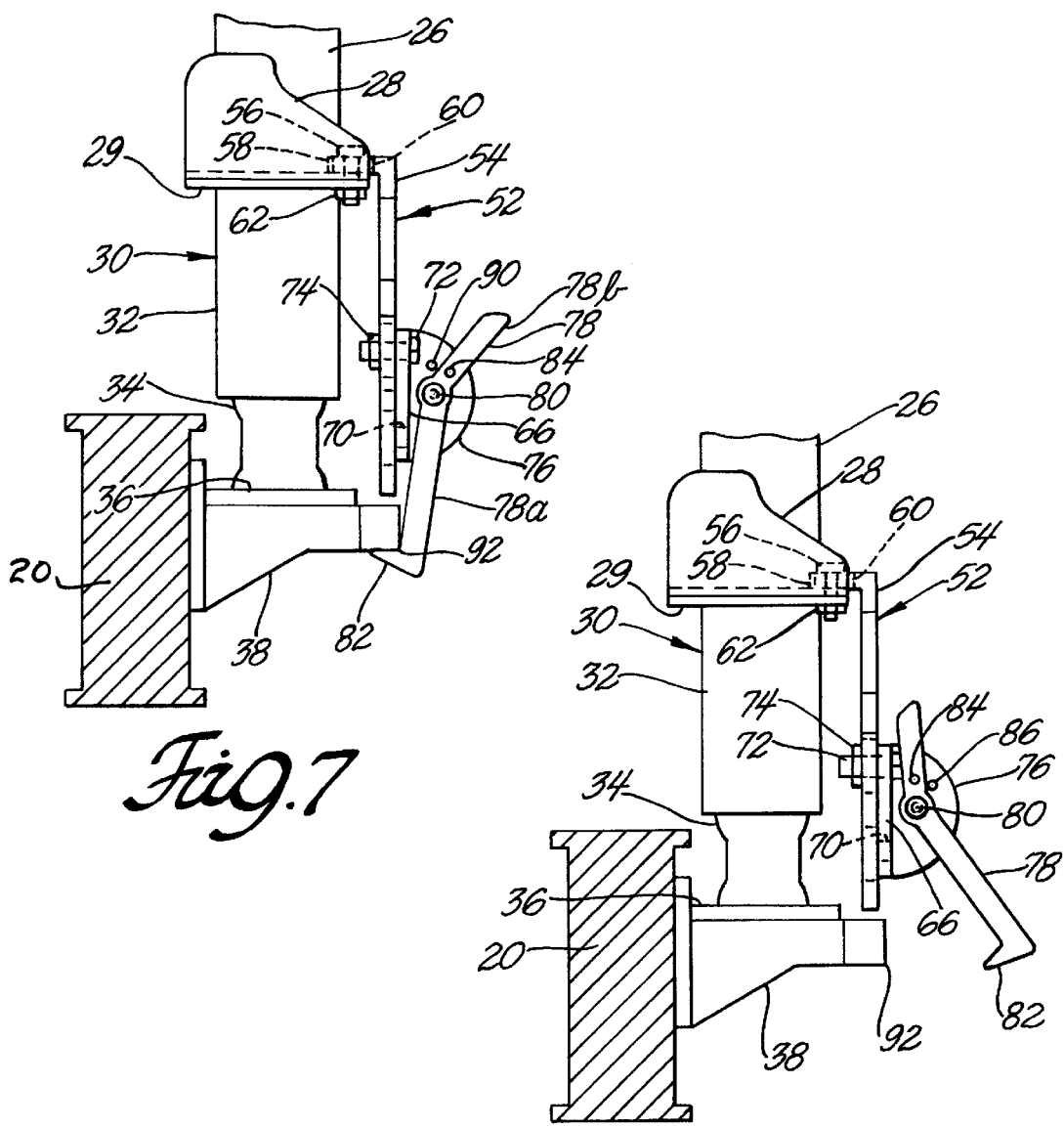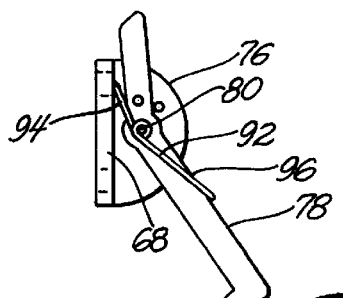

CAB LOCKING MECHANISM

GOVERNMENT USE

The invention described here may be made, used and licensed by the or for the U.S. Government for governmental purposes without paying me any royalty.

BACKGROUND AND SUMMARY

Some trucks in the United States Army combat support fleet have a cab that tilts forward to permit access to the truck's engine compartment. When the cab lowers from its tilted position, it rests on a floating bracket mounted by shock absorbers to the truck's chassis. To prepare the trucks for air transport, the shock absorbers are depressurized so that the cab lowers as far as possible to clear the ceiling of the aircraft's cargo bay. The cab must be locked in its fully lowered position lest it swing up, damaging itself and the cargo bay ceiling.

Conventionally the cab is locked in position by fingers extending from the shock absorbers through mounting brackets fixed to the chassis. Holes in the fingers align with holes in the brackets, and pins are thrust through the aligned holes to fix the fingers to the mounting brackets. A problem with this locking method is that the fingers' position relative to the mounting brackets varies with each lowering of the cab, so that aligning the holes is difficult. Consequently, locking the cab in position with the present apparatus is time consuming and tedious.

I have a new mechanism for locking the cab in its fully lowered position. My mechanism has a first arm fixed to the floating bracket. The connection between the first arm and floating bracket allows the mechanism to be moved inboard or outboard relative to the truck and its chassis. My mechanism has a second arm pivotally mounted to the first arm by a fulcrum element. The connection between the first arm and fulcrum element allows the fulcrum and second arm to be lowered toward, or raised away from, the chassis. The second arm has a projection that engages an elongate edge on the mounting bracket, thereby locking the cab in position. The projection stays engaged with the edge even if the floating bracket and shock absorber move forward or backward relative to the truck and chassis.

BRIEF DESCRIPTION OF THE DRAWINGS

FIG. 2 shows a prior art mechanism for locking the cab in a fully lowered position.

FIGS. 7 and 8 show the locking mechanism in the locked and unlocked configurations, respectively. In these views, one of the tabs of the fulcrum element is removed and a spring is removed to show the swing arm more clearly.

FIG. 9 is a similar view to FIG. 8 that additionally shows a spring biasing the swing arm.

DETAILED DESCRIPTION

Figure 1:
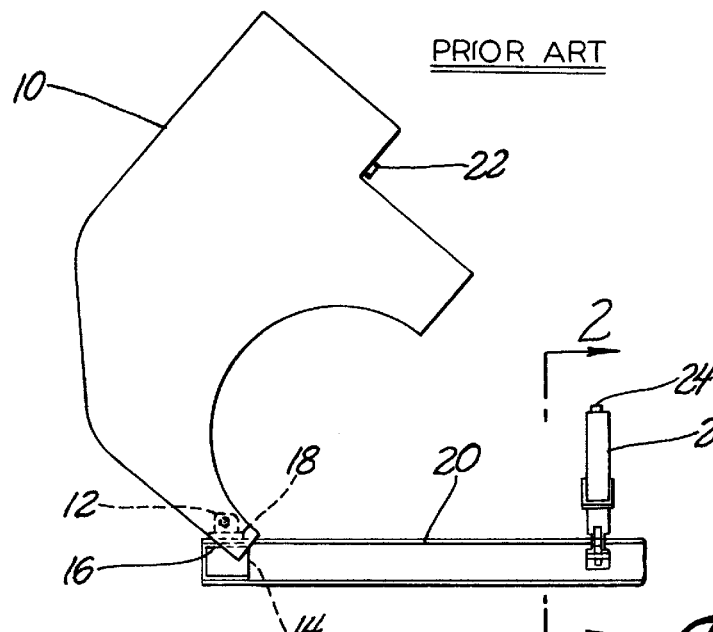
FIG. 1 is a side view of a truck cab tilted on a chassis and a floating bracket mounted on the chassis.

FIG. 1 shows a known truck cab 10 mounted by pivot elements 12 to a chassis cross member 14, with an elastomeric cushion 16 disposed between base plate 18 of the pivot element and cross member 14. The cross member is fixed laterally between two parallel chassis members 20 that run longitudinally of the vehicle (not shown). The cab swings down from its FIG. 1 position until complimentary latching members 22 and 24 engage, whereby the cab is secured to U-shaped floating bracket 26.

Figure 2:
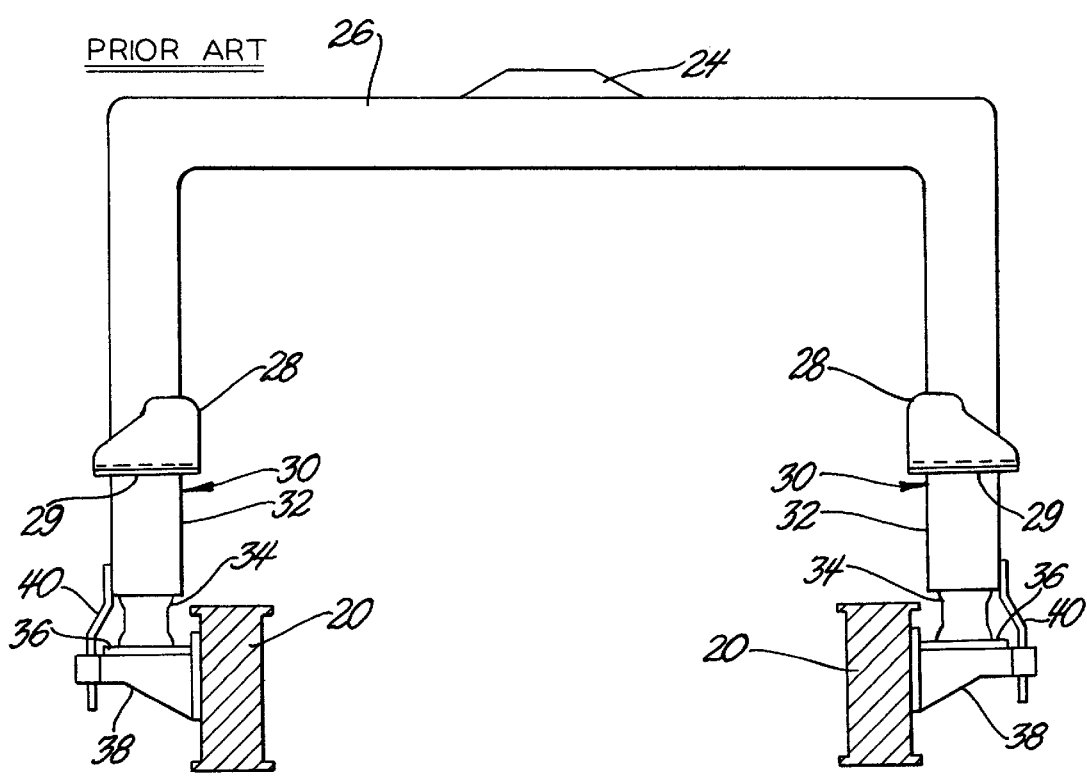
FIG. 2 is a view taken along line 2—2 in FIG. 1.

As best seen in FIG. 2, the legs of bracket 26 have fixed thereto shoe-like adapter mounting brackets 28, to which pneumatic shock absorbers 30 are fixed. The shock absorbers comprise cylinders 32, mounting plates 29 at one end of the cylinders, extensible elements 34 protruding from the other ends of the cylinders, and connector plates 36 on the ends of the extensible elements. The connector plates are fixed to mounting brackets 38, which in turn are fixed to chassis members 20. Fingers 40 extend from cylinders 32 through openings 42 (FIG. 3) in brackets 38, each of which defines apertures 44 and 46 facing the finger. Aperture 48 in finger 40 aligns with apertures 44 and 46 so that a pin 50 can be inserted through all three apertures.

Figure 3:
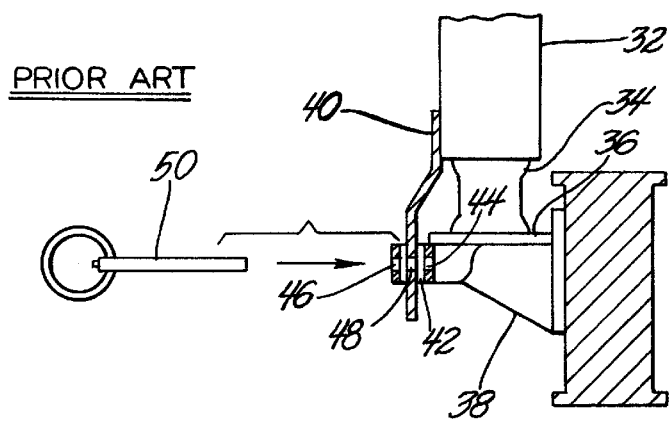
FIG. 3 is. A partly sectioned view showing how a finger of the prior art mechanism passes through a mounting bracket fixed to the truck's chassis.

FIGS. 1, 2 and 3 show shock absorber 32 in a fully depressurized condition. The engagement of pins 50 with finger 40 and brackets 38 locks shock absorber 30 and floating bracket 26 in place, thereby preventing the upward swing of cab 10 about pivot elements 12. Preventing this swing of cab 10 allows the vehicle to be carried in airplanes or other types of transport where the cargo space has limited vertical clearance. However, a problem with the arrangement shown in FIGS. 1, 2 and 3 is that aligning apertures 44, 46 and 48 is extremely difficult in practice.

FIGS. 7 and 8 show and improved locking mechanism 52 for retaining shock absorber 30 in place. Mechanism 52 includes a flat arm 54 disposed along the outboard side of shock absorber 30. Lip 58 extends inboard from arm 54, forms a right angle therewith and defines bolt-accommodating slots 60 oriented perpendicular to the general plane in which arm 54 lies. Ann 54 is fixed to bracket 28 and plate 29 by any appropriate means, but preferably by bolts 56 extending through lip 58, bracket 28, plate 29, and nuts 62.

Figure 4:
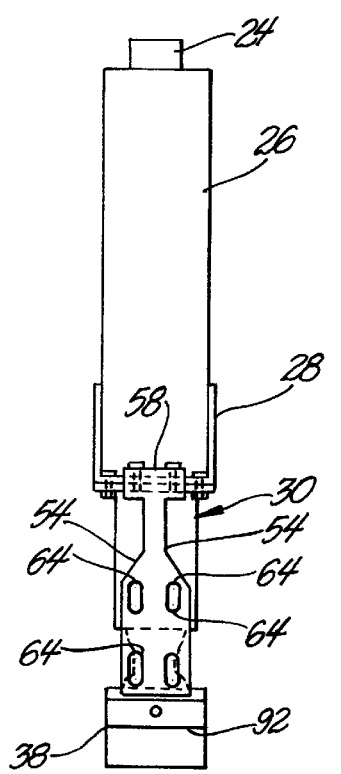
FIG. 4 shows a first arm of my mechanism disposed along a shock absorber to which the floating bracket is mounted.
Figure 5:
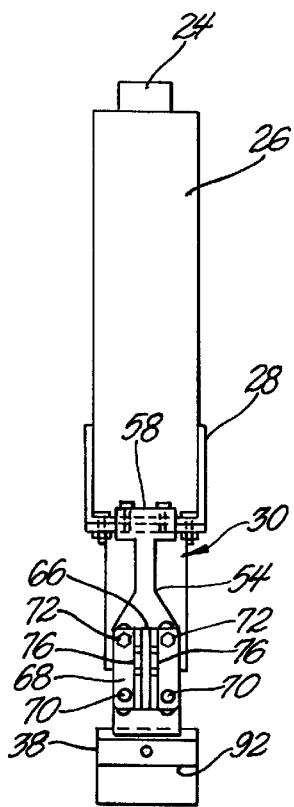
FIG. 5 is similar to FIG. 4, but adds a fulcrum element affixed to the first arm.

Ann 54 defines an array of four slots 64 (FIG. 4) over which a fulcrum unit 66 (FIG. 5) is mounted, the fulcrum unit having a base 68 that defines four holes 70 in registry with slots 64. Bolts 72 and nuts 74 fasten the fulcrum unit to flat arm 54, slots 64 allowing the fulcrum member to be repositioned on the flat arm. The fulcrum member has a pair of semicircular tabs 76 that pivotally mount swing arm 78 by means of axis pin 80.

Swing arm 78 has an overall dog-leg shape and is comprised of an unapertured or solid load bearing segment 78a and an apertured non-load bearing segment 78b. The segments are joined at a relatively thicker section of arm 78 through which axis pin 80 passes. Segment 78a is load bearing in the sense that it will experience tension if upward force is applied to floating bracket 26, whereas segment 78b is non-load bearing in the sense that it experiences no tension in this circumstance. Arm segment 78a has a projection 82 at one end for engaging mounting bracket 38. Arm segment 78b defines aperture 84, which aligns with one of two sets of apertures in tabs 76, depending on the arm's swing position.

Figure 6:
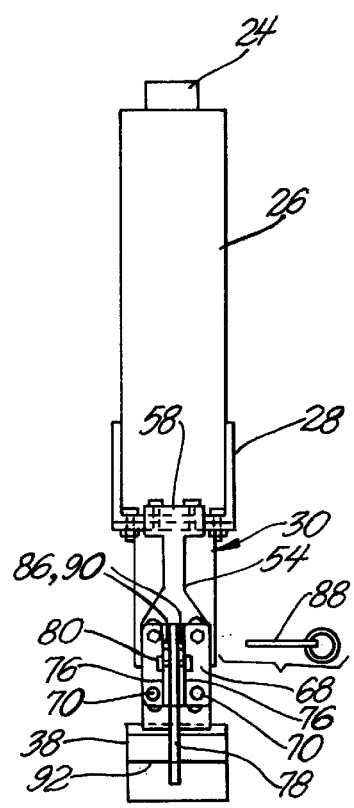
FIG. 6 is similar to FIG. 5, but adds a swinging arm pivotally mounted on the fulcrum element.

In the first swing position, shown in FIG. 7, projection 82 engages mounting bracket 38 so that locking mechanism 52 prevents upward motion of floating bracket 26. Aperture 84 aligns with apertures 86 in tabs 76, so that a pin 88 (FIG. 6) can be thrust through both apertures 86 and through aperture 84 to keep mechanism 52 in its locking configuration. In the second swing position, shown in FIG. 8, projection 82 is removed from mounting bracket 38 so that mechanism 52 allows upward motion of floating bracket 26. Now aperture 84 aligns with apertures 90 in tabs 76, so that pin 88 can be thrust through both apertures 90 and through aperture 84 to keep mechanism 52 in its non-locking configuration.

FIG. 9 shows anti-noise spring 92 that can be used in conjunction with mechanism 52. The spring encircles axis pin 80 and has legs 94 and 96 that contact base 68 and arm 78 respectively. Spring 92 biases arm 78 clockwise and prevents arm 78 from rattling with pin 88 when held thereby in the first or second swing position.

The distance spanned by arms 54 and 78 can be varied by adjusting the position of base 68 on flat arm 54. The latter is accomplished by aligning holes 70 at different positions along slots 64 of the flat arm before tightening bolts 72. This allows locking mechanism to be adapted to the variance in relative positions between floating bracket 26 and mounting bracket 38 which typically occur when cab 10 is lowered onto the floating bracket and shock absorber 30 is thereafter depressurized. In similar fashion and for a similar reason, slots 60 in lip 58 allow arm 78 and the rest of mechanism 52 to be moved inboard or outboard with respect to mounting bracket 38. Additionally, the elongate edge 92 at the under side of mounting bracket provides an advantageous engagement for projection 82. This engagement functions even if floating bracket 26 moves forward or backward, (left or right in FIGS. 4, 5 and 6) relative to mounting bracket 38, since projection 82 can engage bracket 38 at any point along edge 92. In sum, due to its various adaptive features, mechanism 52 can compensate in three dimensions for positional deviation of floating bracket 26 and adapter bracket 28 relative to mounting bracket 38 and chassis member 20.

I do not desire to be limited to the exact details of construction or method shown herein since obvious modifications will occur to those skilled in the relevant arts without departing from the spirit and scope of the following claims.

What is claimed is:

1. In a vehicle having a swingable cab connected to a floating bracket, the floating bracket the floating bracket, supported by shock absorbers mounted to a chassis, a mechanism to limit motion of the floating bracket relative to the chassis, comprising:

a first arm;

means to fix the first arm to the floating bracket;

a fulcrum member fixed to the first arm;

a tab on the fulcrum member;

a second arm pivotally mounted to the tab;

a projection on the second arm;

a mounting bracket fixed to the chassis;

the second arm having one arm position where the projection engages the mounting bracket and having another arm position where the projection is removed from the mounting bracket; and means to retain the second arm in a selected arm position.

2. The mechanism of claim 1 further comprising means for compensating for position variance of the floating bracket relative to the mounting bracket.

3. The mechanism of claim 2 wherein the compensating means includes means for varying a distance spanned by the first and second arms.

4. In a vehicle having a cab swingable on a chassis and connected to a floating bracket, wherein the floating bracket is supported by shock absorbers mounted on the chassis, a mechanism to limit a motion of the floating bracket and cab relative to the chassis, comprising:

a first arm;

means to fix the first arm to the floating bracket;

a fulcrum member fixed to the first arm;

a tab of the fulcrum member;

first and second holes defined by the tab;

a second arm pivotally mounted to the tab;

a load bearing, solid segment of the second arm;

a projection on the load bearing segment;

a non-load bearing segment of the arm;

an aperture defined by the non-load bearing segment;

a mounting bracket fixed to the chassis;

the second arm having one arm position where the projection engages the mounting bracket and the aperture aligns with the first hole in the tab, the second arm having arm another position where the projection is removed from the mounting bracket and the aperture aligns with the second hole in the tab; and a pin passing through the aperture and one of the holes.

5. The mechanism of claim 4 further comprising means for compensating for position variance of the floating bracket relative to the mounting bracket, wherein the compensating means comprises:

a slotted lip extending from the first arm;

means for varying a distance spanned by the first and second arms; and an elongate edge of the mounting bracket engaged by the projection during the one arm position.

* * * * *